United States Patent [19]
Pierce

[11] 4,232,990
[45] Nov. 11, 1980

[54] WINCH-OPERATED EXTENDABLE TONGUE FOR BOAT TRAILERS AND THE LIKE

[76] Inventor: Richard C. Pierce, R.R. #1, Stratton, Nebr. 69043

[21] Appl. No.: 926,526

[22] Filed: Jul. 20, 1978

[51] Int. Cl.³ .............................................. B60P 1/00
[52] U.S. Cl. .................................. 414/559; 280/482; 280/414 R
[58] Field of Search ............ 414/559; 280/482, 414 R, 280/478 A, 478 R; 9/1.1

[56] References Cited
U.S. PATENT DOCUMENTS

| | | | |
|---|---|---|---|
| 2,882,064 | 4/1959 | Morrison | 280/414 R |
| 3,140,003 | 7/1964 | Horner | 280/414 R |
| 3,284,101 | 11/1966 | Arnold | 280/482 |
| 3,326,573 | 6/1967 | Neitzey, Jr. | 280/482 |
| 3,767,231 | 10/1973 | Grosse-Rhode | 280/482 |
| 3,955,582 | 5/1976 | Pierce | 128/352 |
| 3,989,266 | 11/1976 | Foster | 280/482 |

*Primary Examiner*—Stephen G. Kunin
*Assistant Examiner*—Lawrence E. Williams
*Attorney, Agent, or Firm*—Edwin L. Spangler, Jr.

[57] ABSTRACT

This invention relates to a winch-actuated extendable tongue for boat trailers and the like that is characterized by the winch being so located and reaved with respect to a pair of telescoping elements that it is effective to positively drive the tongue into extended as well as retracted position regardless of whether the load thereon is such as to extend or retract same. More specifically, the winch is mounted on the outer of the two telescoping elements for movement therewith and its cable is reaved from an initial point of attachment on the inner of said telescoping elements, around the winch drum several turns, over a pulley on the end of the outer element remote from the initial point of attachment, back again toward the latter to a second pulley on the adjacent end of the outer element, around the second pulley and toward the remote end of the outer element again to a second point of attachment on the inner element.

5 Claims, 6 Drawing Figures

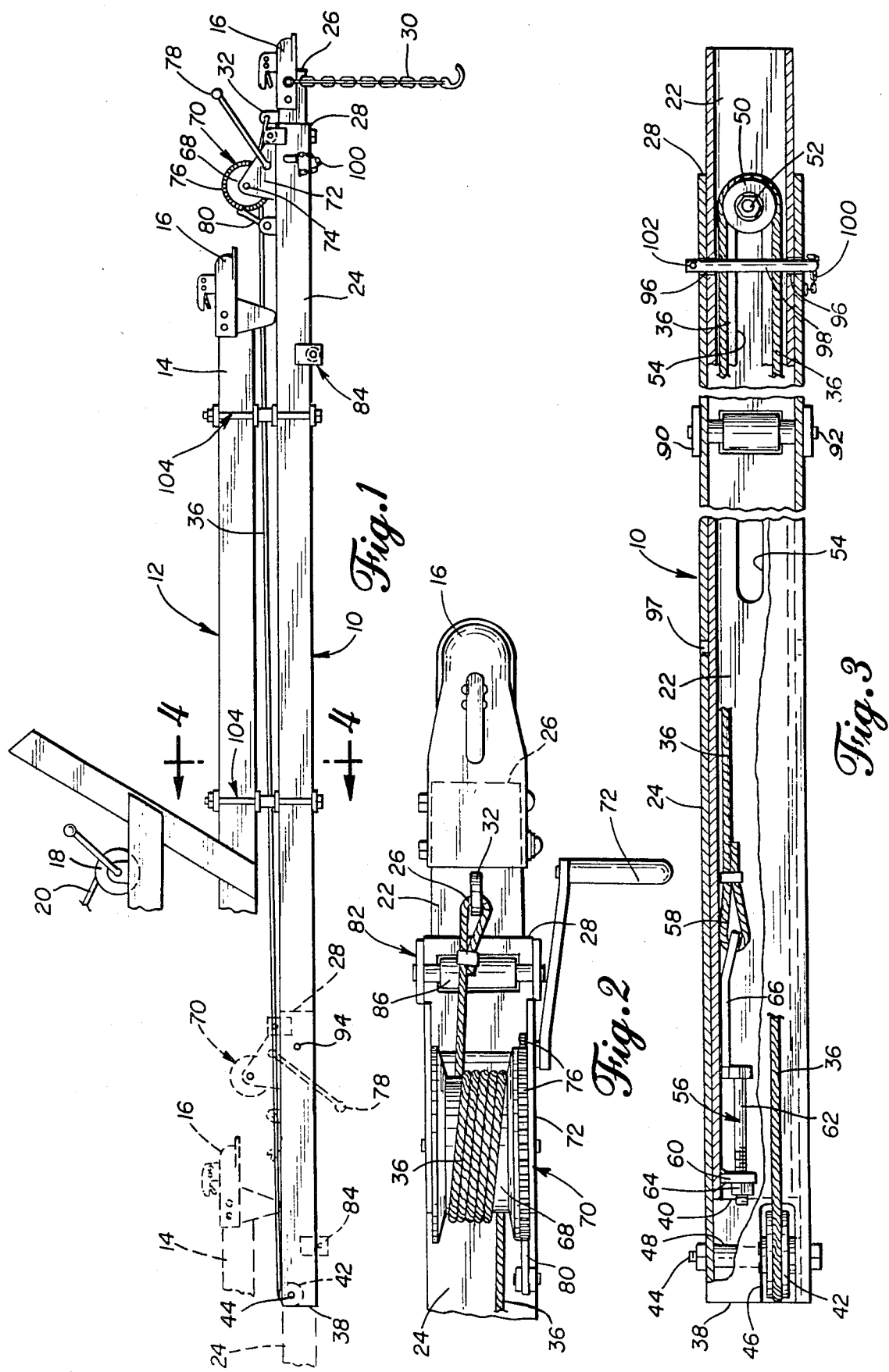

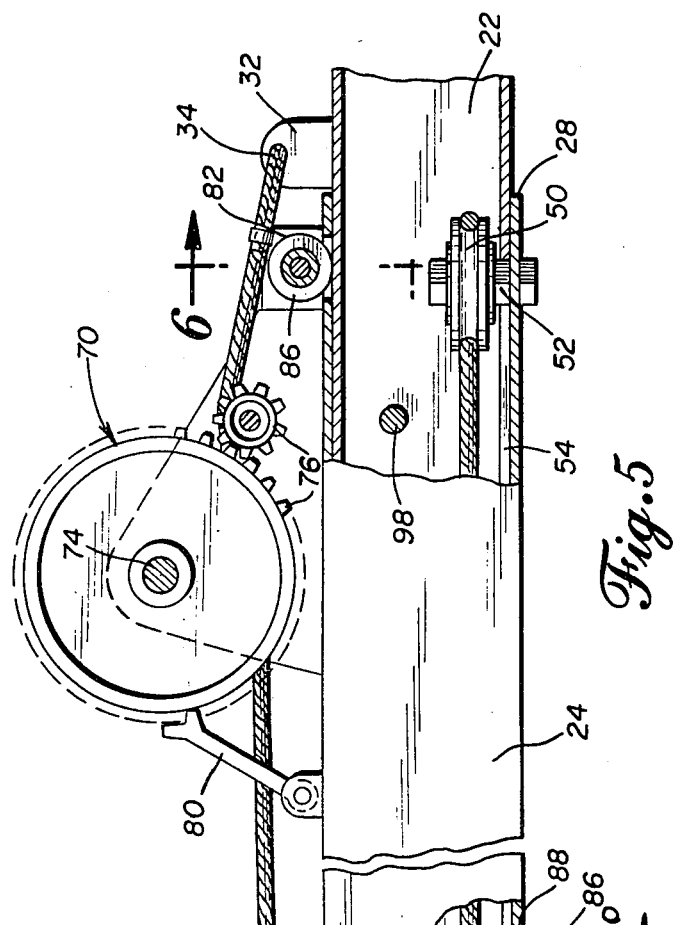
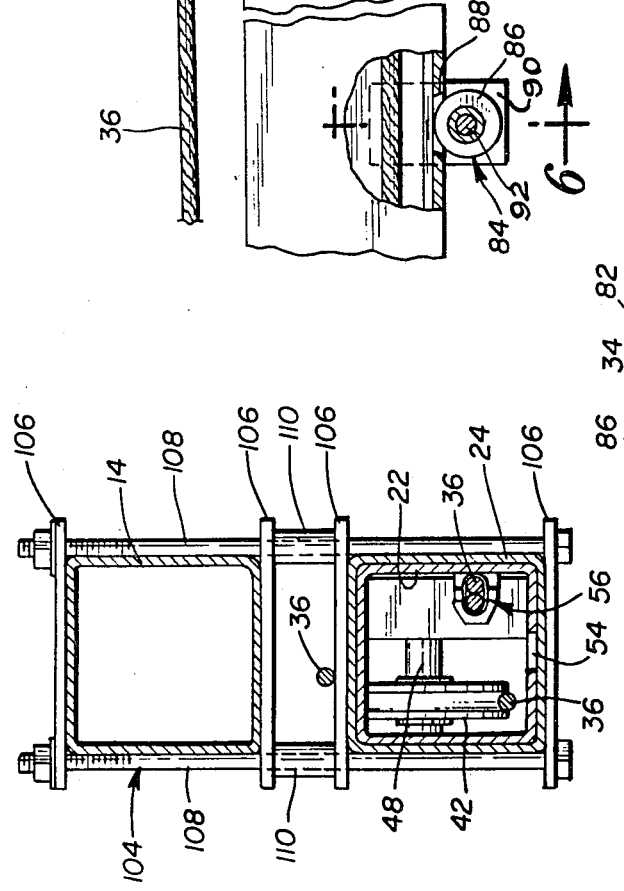
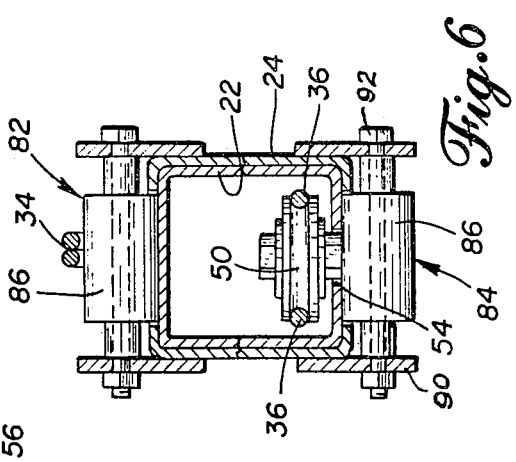

WINCH-OPERATED EXTENDABLE TONGUE FOR BOAT TRAILERS AND THE LIKE

Boat owners with large hulled boats must generally leave them in the water except for an occasional period, usually annually, when they are taken out and the hull cleaned and serviced. Small boat owners, on the other hand, are able to remove their boats and haul them home on a vehicle-drawn boat trailer when not in use thus saving marina fees and preventing the hull damage that inevitably occurs when even a fiberglass hull is left in the water all the time.

While being able to haul one's boat from place to place on a trailer has certain distinct advantages, it is by no means free of problems. Certainly one of the major ones is launching and retrieving the boat from the trailer.

Many, if not most, large bodies of water upon which boating is encouraged provide one or more launching ramps at convenient locations accessible to the towing vehicle. In theory at least, the towing vehicle is employed to back the trailer down the ramp and into the water sufficiently far so that the hull will float free when loosened from the trailer. The problems generally arise because the close proximity of the bow of the boat to the rear end of the towing vehicle makes it difficult to get the hull far enough out in the water to float free of the trailer without, at the same time, also submerging the rear end of the towing vehicle. The obvious solution to the problem would seem to be a longer boat trailer tongue; however, this is not the case since such an assembly is totally unsuited to highway travel due to maneuvering difficulties and the like.

It has now been found in accordance with the teaching of the instant invention that these and other problems can be eliminated by the simple, yet unobvious, expedient of providing the trailer with an extendable tongue which, in retracted position, brings the boat into close-coupled relation to the towing vehicle for most efficient maneuvering and, upon being extended, enables the boat and its trailer to be placed in the water while leaving the towing vehicle on dry land where it has the best traction and other necessary attributes. It has also been found, however, that one should not rely upon gravity alone to extend the tongue and merely supply power to retract same because, on occasion, it becomes necessary to drive the tongue into extended position such as for example, getting the trailer wheels over an obstruction, backing it uphill into a storage facility, etc. Accordingly, the instant extendable trailer tongue is provided with a novel winch drive which positively powers the unit into both its extended and retracted positions while, at all times, maintaining close control over its movements.

Among the prior art devices known to applicant that broadly relate to extendable tongues and the like, by far the most pertinent is his own U.S. Pat. No. 3,955,582. It, however, differs materially from the instant unit in that the winch mechanism itself travels relative to the bar upon which it is mounted while, in the instant case, it remains permanently fastened to one of the telescoping elements for movement therewith relative to the other. Moreover, it is essential that the winch travel in applicant's patented obstetrical tool because it does the pulling and the main objective of the tool is to essentially double the pull realizable from an extendable post of a given length. In the instant case, on the other hand, both ends of the telescoping tongue are operatively attached to two loads which must be pushed apart and pulled back together without regard to the length of the pull in relation to the length of the tongue. The fundamental functional difference is, of course, the fact that applicant's patented tool both pushes and pulls on the same end while the instant device pushes and pulls in opposite directions.

Patents such as that of Arnold U.S. Pat. No. 3,284,101, while showing an extendable tongue, provide no drive operative to extend and retract it. Reed U.S. Pat. No. 3,326,398 deals with a rack and pinion mounted traveling winch type boat launcher but it has no extendable tongue feature whatsoever. The wire stretcher shown in Devolld U.S. Pat. No. 1,216,089 utilizes a traveling block arrangement which, conceivably, could be adapted for retracting an extendable tongue, however, it is incapable of being used to forcibly extend same. Hilmer U.S. Pat. No. 3,718,317 deals with a portable hitch ball mounted winch but it has no tongue extension capability. Anderson's telescoping boom (U.S. Pat. No. 3,242,894) utilizes a winch as a hoist mechanism but this winch performs no function in extending the boom, the latter being accomplished by a compression spring. This spring, moreover, permanently extends the boom and it is only an unusual load on the end thereof that ever retracts it.

Bearing in mind the aforementioned differences and advantages over the prior art it is, therefore, the principal object of the present invention to provide a novel and improved winch-operated extendable tongue for boat trailers and the like or wherever an extendable bar is needed that is powered to both extend and retract same.

A second objective of the within described invention is to provide an extendable tongue that can be made as an accessory to be fitted to fixed tongue trailers and other towed implements.

Another object is the provision of a winch-actuated extendable trailer or implement tongue that can be latched in any position between full extension and fully retracted position by merely latching the winch drum against rotation.

Still another object of the invention herein disclosed and claimed is to provide a device of the type aforementioned wherein provision is made for positively latching the tongue in retracted position so that the trailer or other implement being towed will travel in close-coupled safe relation to the towing vehicle.

An additional objective is to provide a telescopable tongue operated by a winch which travels with the movable telescoping element of the two so that the operator remains in the selfsame position to the towed item so as to more closely supervise the proper positioning thereof.

Further objects are to provide an extendable trailer tongue and actuating mechanism therefor that is compact, rugged, relatively lightweight, versatile, easy to operate, safe, reliable and even decorative in appearance.

Other objects will be in part apparent and in part pointed out specifically hereinafter in connection with the detailed description of the drawings that follows, and in which:

FIG. 1 is a side elevation showing the extendable tongue of the present invention clamped in place beneath the fixed tongue of a conventional boat trailer, portions of the latter having been broken away to conserve space;

FIG. 2 is a fragmentary top plan view showing the front end of the tongue to an enlarged scale;

FIG. 3 is a fragmentary top plan view to the same scale as FIG. 2, portions of which have been broken away to conserve space while other portions have been broken away and shown in section to more clearly reveal the interior construction;

FIG. 4 is a section taken along line 4—4 of FIG. 1 to a still further enlarged scale;

FIG. 5 is a fragmentary side elevation to the same scale as FIG. 4, portions of which have been broken away and shown in section to better reveal the interior construction; and FIG. 6 is a section taken along line 6—6 of FIG. 5.

Referring next to the drawings for a detailed description of the instant invention, reference numeral 10 has been chosen to identify the winch-operated boat trailer tongue extension in a general way while numeral 12 has been selected to similarly identify a conventional boat trailer having a standard tongue 14 projecting forwardly therefrom for attachment to a towing vehicle (not shown) by means of coupling 16. The trailer 12 includes a hand-operated winch 18, the winch cable 20 of which detachably fastens onto the boat hull (not shown) and, upon being payed out, allows the boat to roll backward off the trailer into the water in the conventional manner. By reversing this procedure, the boat is hauled from the water onboard the trailer.

The conventional boat trailer tongue 14 is of a fixed length and, as such, it cannot be extended to increase the distance separating the towing vehicle and the boat which means, of course, that the towing vehicle itself must be placed in or at least very close to the water. Accordingly, the sole function of the extendable tongue is to provide the user with the means for increasing and decreasing the distance between the boat and the vehicle towing same so that launching and reloading is facilitated while, at the same time, securing the two together in close-coupled relation for movement along the highway.

The extendable tongue 10 comprises inner and outer elongate members 22 and 24, both of which are hollow and the inner member 22 of which is received telescopically inside the outer 24. In the particular form shown, both members have a rectangular cross section to prevent relative rotational movement therebetween.

The front end 26 of the inner telescoping element 22 projects forwardly beyond the corresponding end 28 of the outer one and is provided with a coupling 16 of the standard type adapted to detachably connect onto a ball hitch (not shown) provided on the rear end of the towing vehicle. Safety chain 30 comprises a standard accessory used with such a coupling. When extendable tongue 10 is used as shown, coupling 16 on the fixed tongue 14 is not needed nor is it used. The extendable tongue 10 may also be fitted with a jack (not shown) on the front end thereof to support same when detached from the towing vehicle. No useful purpose would be gained by detailing such a jack since the use thereof is old in the art and its presence would tend to obscure more important features of the invention.

Also affixed to the projecting front end 26 of the inner telescoping element is an eye 32 to which is permanently secured one end 34 of winch cable 36. Details concerning the reaving of the winch cable are best left for later pending completion of the description of certain other key structural elements.

The rear end 38 of the outer telescoping element 24 projects rearwardly beyond the corresponding end 40 of the inner one so as to leave space for mounting rear pulley 42. This pulley is mounted for rotation on transversely-extending shaft 44 extending between the side walls of the outer telescoping element preferably slightly above center as shown so that the pulley projects above the latter a small distance through slot 46 in the top wall. Additionally, a spacer 48 is preferably employed on shaft 44 abutting one face of the pulley and functioning to hold the latter offset closer to one side wall of the outer tubular element than to the other as is most clearly revealed in FIG. 4. In the fully retracted condition of the telescoping tongue illustrated in FIG. 3, the rear end of the inner element lies spaced forwardly of pulley 42 a distance sufficient to permit free rotation of the latter.

A second or front pulley 50 is mounted upon the bottom wall of the outer telescoping element 24 on upstanding pin 52 which projects up through a long slot 54 in the bottom wall of the inner telescoping element, this slot permitting relative telescopic movement of said inner element between its fully retracted and fully extending positions. Pulley 50 is actually housed inside both the inner and outer telescoping elements even though it remains fixed in relation to the latter element as will be explained presently.

In the rear end 40 of the inner telescoping element, an adjustable eye subassembly indicated in general way by numeral 56, is provided to which the other free end 58 of the winch cable 36 is permanently secured. In the particular form shown, adjustable eye subassembly 56 includes a fixed eye 60 welded or otherwise permanently attached to the side wall of the inner telescoping element remote from the side wall of the outer one adjacent which pulley 42 is located, a bolt 62 having its threaded shank 64 passed through the fixed eye 60 and adjustably mounted therein by means of nut 64, and a forwardly-extending dogleg-like movable eye 66 projecting forwardly of the bolt head to which it is permanently attached. This adjustable eye subassembly has as its obvious function that of taking up any slack developing in the winch cable.

The winch cable 36 extends forwardly from adjustable eye subassembly 56 along one side of the inner telescoping element, around front pulley 50 and back again along the opposite side thereof before passing out through the open rear end 40 thereof. From this point, the cable passes underneath rear pulley 42 around the rear thereof and forwardly along the top of the outer telescoping element to winch drum 68 carried by the latter on its front end for movement therewith. After several turns around the winch drum, the remaining free end 34 of the winch cable is dead ended as previously noted at eye 32 carried on the projecting end 26 of the inner telescoping element. With the cable thus reaved, a load such as a boat trailer attached to said extendable tongue and resting upon a downwardly-sloping ramp to the rear of the towing vehicle will tend to elongate same by moving it from retracted into an extended position. If, at this point the winch drum is free to rotate counterclockwise, as viewed in FIG. 1, it together with the outer telescoping element 24 will move to the left relative to the inner telescoping element 22 which will remain fixed in its relation to the towing vehicle.

Once the boat is winched onto the trailer with the tongue extended as above indicated, reversing the above operation will bring the boat and its trailer into close-coupled relation to the towing vehicle.

Winch drum 68 comprises a part of a conventional winch subassembly that has been generally indicated by numeral 70 and which includes a mounting frame 72, a transversely-extending shaft 74 mounting the drum for conjoint rotation, and meshed drive gears 76 for transfering power from handcrank 78 to the drum. A pawl 80 is movable into engagement with the gear teeth to prevent winch drum rotation except when the tongue is being extended or retracted. Other types of winches could, obviously, be substituted for the one shown without departing from the essential teaching of the instant invention.

Another feature worthy of specific mention is that of front and rear roller subassemblies indicated broadly by reference numerals 82 and 84, respectively. The first of these roller subassemblies 82 is carried on the front end 28 of the outer telescoping element and it includes an anti-friction roller 86 mounted to roll along the top wall of the inner telescoping element. The second of the two roller subassemblies 84 is, likewise, carried by the outer telescoping element rearwardly of the first and with its anti-friction roller 86 operating within a transverse slot 88 in the bottom wall of said outer element so as to lie in supporting rolling engagement with the underside of the inner telescoping element. These roller subassemblies are both located near the front end of the tongue 10 in position such that the inner element 22 thereof is supported thereby during its entire excursion between fully retracted and fully extended position. In the preferred embodiment of the invention, the pillow blocks 90 that carry the roller shafts 92 preferably include set screws (not shown) by means of which said shafts together with the rollers mounted thereon can be adjusted to minimize the frictional contact between the inner and outer tubular elements as they slide along relative to one another.

While towing the trailer along the highways and elsewhere it is, of course, essential for safety reasons that the telescoping elements 22 and 24 be positively locked together in fully-retracted position. This is accomplished by providing these elements with alignable pairs of pin-receiving openings 94 and 96 to receive a latch pin 98. A chain 100 securing the pin to the outer telescoping element is a wise precaution to prevent its becoming lost. Also, an opening 102 in the latch pin to receive a padlock, safety pin or other element (not shown) effective to prevent accidental removal of the latch pin, is essential from the standpoint of safety.

Lastly, in the particular form of the invention shown, the extendable tongue 10 is shown as an accessory to be used in conjunction with and as an addition to a conventional fixed boat trailer tongue 14. Obviously, this arrangement permits the many thousands of fixed tongue boat trailers to be modified and converted to use the extendable tongue of the present invention. To do so, however, bracket subassemblies 104 must be provided for fastening the fixed tongue 14 of the boat trailer 12 to the extendable tongue 10 of the instant invention. These brackets 104 comprise little more than a series of flat apertured plates 106 bracketing the top and bottom walls of both the fixed and extendable tongues connected together by bolts 108. About the only distinguishing feature thereof are the spacers 110 that maintain a vertically-spaced relation between the longitudinally-aligned tongues that allows the winch cable 36 to ride along therebetween.

What is claimed is:

1. For use with a vehicle-drawn trailer, the winch-operated extendable tongue which comprises: a first elongate rigid tubular element having front and rear ends and an elongate slot intermediate its ends, said rear end being open; connecting means carried by the front end of said first tubular element for detachably hitching same to a towing vehicle; a second elongate rigid tubular element having an open front end and a rear end, said second tubular element being sized to telescopically receive said first tubular element for relative movement therein between a fully retracted position with the connecting means on the front end of the inner tubular element projecting forwardly beyond the open front end of the second tubular element and an extended position wherein the rear end of said first tubular element remains housed inside the second to an extent effective to cooperate therewith in defining a rigid beam; a first pulley journalled for rotation about a transverse axis adjacent the rear end of the second tubular element beyond the corresponding end of the first tubular element; a transverse shaft carried by the second tubular element spaced forwardly of the first pulley and extending into the first tubular element through the slot therein; a second pulley mounted on the transverse shaft for rotational movement thereon within said first tubular element; and, winch means carried by the second tubular element for movement therewith relative to said first tubular element, said winch means including a drum mounted for rotation about a transverse axis, means operatively associated with said drum for rotating same in either direction, and a length of cable reaved from a first point of attachment on the projecting end of the first tubular element, around the winch drum several turns, rearwardly around the first pulley and forwardly inside both tubular elements, around the second pulley and rearwardly again to a second point of attachment inside the first tubular element adjacent the rear end thereof, said winch being operative upon rotation in one direction to drive the telescoped elements apart into extended relation thus increasing the distance separating a towing vehicle fastened to the connecting means from a towed trailer or the like depending from the rear end of the second tubular element, and upon rotation in the opposite direction to drive the aforesaid telescoped elements together into retracted relation thus closing the gap separating the towing vehicle from that which is being towed thereby.

2. The extendable trailer tongue as set forth in claim 1 wherein the rear end of the second tubular element is slotted and the first pulley is located within said slot.

3. The extendable trailer tongue as set forth in claim 1 wherein the slot in the first tubular element and the pulley shaft extending therethrough cooperate to limit the travel of the telescoped elements between extended and retracted positions.

4. The extendable trailer tongue as set forth in claim 1 wherein a first roller mounted for rotation about a transverse axis is carried on the front end of the second tubular element positioned and adapted to roll along the top of the first tubular element and hold it away from the second; the underside of the second tubular element has a transverse slot in the underside thereof spaced rearwardly of the first roller and opening onto the underside of the first tubular element when fully extended; and in which a second roller is carried by the underside of said second tubular element for rotational movement within the slot therein in supporting relation to the first tubular element.

5. The extendable tongue as set forth in claim 1 wherein the length of the cable wound around the winch drum is at least equal to the length of the slot in the first tubular element.

* * * * *